(No Model.)
J. P. GRANT.
MOLD FOR FORMING TILES FROM CONCRETE.
No. 305,303. Patented Sept. 16, 1884.
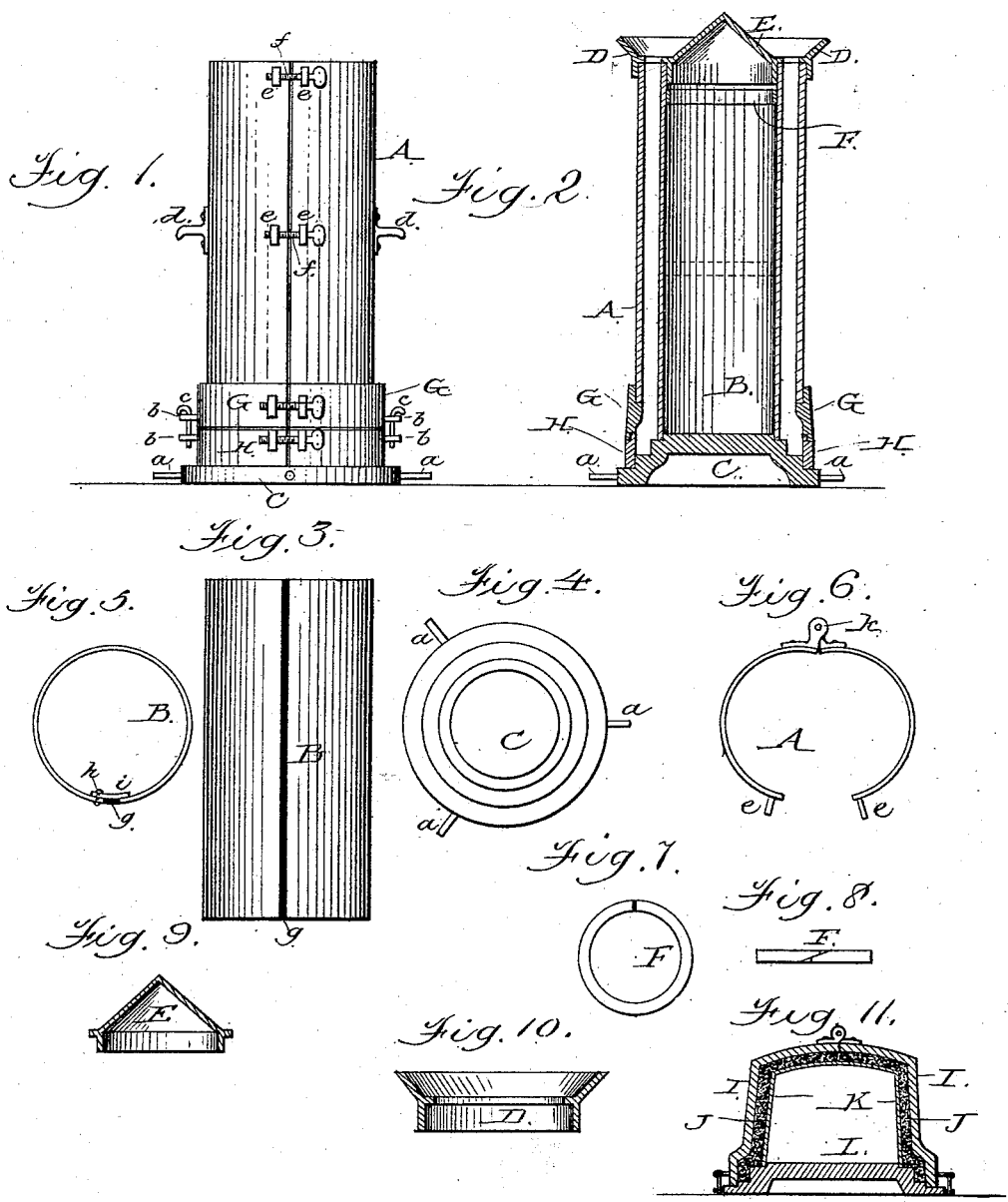
Witnesses:
T. Walter Fowler.
Wm. L. Speiden.
Inventor:
J. Pierson Grant
by
J. D. Green
atty

UNITED STATES PATENT OFFICE.

J. PIERSON GRANT, OF NEW YORK, N. Y.

MOLD FOR FORMING TILES FROM CONCRETE.

SPECIFICATION forming part of Letters Patent No. 305,303, dated September 16, 1884.

Application filed March 2, 1882. (No model.)

*To all whom it may concern:*

Be it known that I, J. PIERSON GRANT, a citizen of the United States, residing in the city, county, and State of New York, have invented a new and useful Improvement in Molds for Forming Concrete or other Similar Pipes, of which the following is a specification.

My invention relates to improvements in molds for forming water, drain, or other pipes composed of concrete or other plastic material, and the object of which is to facilitate the making of such pipe, and by which means I make them at less expense and more compact and perfect than any heretofore made. I attain these objects by the mechanism illustrated in the accompanying drawings, which form part of this specification, in which—

Figure 1 is a vertical view of the outer shell of the mold, (without the hopper,) and showing the front joinings thereof. Fig. 2 is a central vertical sectional view of the mold when all together, showing the parts in detail. Fig. 3 is a vertical view of the inner shell of the mold. Fig. 4 is a plan view of the bottom piece of the mold. Fig. 5 is a cross-section of Fig. 3. Fig. 6 is a cross-section of the outer shell of the mold in Fig. 1, showing one of the hinges $k$ to said outside shell and lugs in front by which such outer shell is fastened together. Figs. 7 and 8 are views of expansion-rings used inside of the inner shell of the mold to keep such shell in form when used. Figs. 9 and 10 are cross-sectional views of the pieces that form the hopper to the mold, as in Fig. 2. Fig. 11 is a cross-sectional view of a centrally and longitudinally divided pipe within the mold and showing a cross-section of the mold, such mold being for one-half of such pipe.

The mode of constructing and using such molds are as follows:

The bottom part of the mold, C, Figs. 2 and 4, is formed as shown in the two figures, made of cast-iron and of suitable thickness—say one and one-half inch thick — having handles $a$, by which said bottom piece may be turned back and forth, so as to loosen and smooth the inside of the socket part of the pipe. The ring H is fitted onto the bottom piece, C, as shown, and is halved or lap-jointed with ring G, in which the offset or shape of the socket part is formed, and which piece G is rabbeted on the inner and upper edge to receive the wrought-iron shell A, and which is riveted in such rabbet. This ring H, ring G, and shell A extend from the bottom piece, C, upward to the top of the pipe-mold. This outer shell A and rings G and H are divided front and rear, as shown in Figs. 1 and 6. The two parts are held together at the back part of the mold by two or three hinges, as at $k$, Fig. 6. The front parts are fastened together by clamps or screws, as shown on Figs. 1 and 6, by the lugs $e$ and thumb-screw $f$, likewise the back part of the ring H. This entire outer shell A and rings G and H can be opened or closed at pleasure by the use of the screws or clamps $f$. The lugs $b\ b$ on the rings H and G, and the hooks, bolts, or pins $c\ c$, are to hold together the rings H and G. There are handles $d\ d$, by which the molds may be handled. The bottom piece, C, and ring H may be fastened together by hooks or bolts in any desired form. The inner shell B is made to fit onto the bottom piece, C, as shown in Fig. 2, and extends to the top of shell A. This inner shell B has a piece, $j$, riveted onto one side of the joint, as at $h$, and a small space left, as at $g$, Fig. 5, so that said shell may enlarge or diminish in diameter a little without leaving an opening through, and so that said inside shell can be readily loosened from the pipe when formed, and when the bottom piece, C, and the expansion-ring F are removed.

Figs. 7 and 8 is an expansion-ring used on the inside of the inner shell B to keep it in shape during the driving or pressing the material into the mold. The cap-piece E is formed to fit into and onto the inside shell B at the top, as shown at Fig. 2. The piece D, Fig. 10, is a ring having the upper part flaring outward and a small projection on the inside, which will rest on the end of the outer shell A, and a portion of said ring to slip down on the outside of said outside shell A, so that when the conic piece E is put into and onto the inner shell B, and the flaring ring is put onto the shell A, the two form a hopper into which the material for making the pipe is put before pressing or driving the same into said mold.

Fig. 11 is a cross-section of one half of a pipe divided longitudinally, and is to be put together with lap-joints, the other half without the projecting flange.

The piece L is to be of cast metal of any desired thickness. The inner and outer shells are to be fitted into piece L, as shown in Fig. 11. The inside shell K is preferably made in three pieces, of heavy sheet-iron, and fitted to a wooden form, so that when the mold is filled, the piece L removed, then remove the inner shell one piece at a time.

The outer shell I is to be of light boiler-iron, fastened by hooks or bolts to the piece L, and hinged at the other two corners or at the center, the socket end of the mold or the top and bottom to be formed similar to that described for round pipe, only the piece C cannot be turned around. If this pipe is to be round, or nearly so, one hinged joint only is required.

I will now describe the mode of molding the pipe in such molds. Put the ring H onto the bottom piece, C; set the inner shell B onto said piece C; then fill the lower ring, H; ram such material hard; then set on the outer shell; see that the bottom joints fit their place; then place an expansion-ring in the center between top and bottom upon projecting pins in the inner shell for that purpose; then put on the conic cover E, which answers the purpose of cover and expansion-ring; then put on the flaring ring D; then put between the outer and inner shells three tapering pieces of iron to equalize the space between the shells at the top; then put the material the pipes are to be made of into the hopper, a little at a time, and drive it into the mold, so that it is firm and hard. Then to remove the pipe from the mold, remove the top piece, D; smooth the top end of the pipe; then remove the piece E and expansion-ring; then turn the mold bottom end up; unfasten the piece C from the ring-piece H; turn the piece C back and forth to loosen it; then remove it; next remove the inner shell; then open the outer shell by unfastening the screws or clamps; turn back this outer shell, and the pipe is complete and standing on the small end. The reason for making the pieces H and G in two pieces is to make the socket end of the pipe solid and perfect, which could not be done with the outer shell made in the ordinary way. The bottom piece, C, forms a positive seat for both outer and inner shells, so that no expansion-ring is required at that end of the mold.

The pipe, Fig. 11, is made in substantially the same manner—viz., socket end down, the mold having the pieces C and H, also the hopper at the top.

J shows the concrete pipe in the mold.

Pipes have been made in molds with the socket end down; but they were not able to make that end solid without turning the mold over and putting in or on more material; but in concrete or a quick-setting material this cannot be done and make perfect pipe. The offset in the socket end of the pipe is a little more than the thickness of the pipe, and the material named would not properly unite when turned the bottom end up for that purpose; therefore the necessity of having the sectional piece H, as described.

I am aware that it is not new in tile-machines to form a mold of an outer and an inner shell supported in a vertical position, and provided with a base, and such I lay no claim to, broadly; but,

Having thus described my invention, what I claim and desire to secure by Letters Patent of the United States, is—

1. In a mold for forming pipe of concrete or other similar material, the piece C, formed to receive the outer and inner shells, A and B, and to form the inside of the socket end of the pipe, in combination with the bottom piece, H, of the outer shell, substantially as and for the purposes described and set forth.

2. In combination, the pieces C and H, the outer and inner shells, A and B, and ring F, substantially as and for the purposes described and set forth.

3. In a mold for making concrete or other pipe, the combination of the funnel-shaped hopper, composed of the pieces D and E, and shells A and B, substantially as and for the purposes described and set forth.

4. In a mold for making concrete or similar pipe, the funnel-shaped hopper, composed of the pieces D and E, and pieces C and H, and shells A and B, substantially as and for the purposes described and set forth.

5. The combination, in a mold for forming concrete or other similar pipe, which is divided longitudinally, the outer shell I, inner shell K, and side or back piece, L, with the pieces C and H, and beveled pieces D and E, made to suit the form of mold required, substantially as and for the purposes described and set forth.

J. PIERSON GRANT.

Witnesses:
SAM. TRO. SMITH,
R. B. CORSLEY.